US010979965B2

(12) United States Patent
Rosa et al.

(10) Patent No.: US 10,979,965 B2
(45) Date of Patent: Apr. 13, 2021

(54) IDLE-MODE CELL SELECTION MEASUREMENTS

(71) Applicant: Nokia Solutions and Networks Oy, Espoo (FI)

(72) Inventors: Claudio Rosa, Randers (DK); Frank Frederiksen, Klarup (DK)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 15/780,422

(22) PCT Filed: Nov. 30, 2016

(86) PCT No.: PCT/EP2016/079209
§ 371 (c)(1),
(2) Date: May 31, 2018

(87) PCT Pub. No.: WO2017/093282
PCT Pub. Date: Jun. 8, 2017

(65) Prior Publication Data
US 2018/0359683 A1     Dec. 13, 2018

(30) Foreign Application Priority Data
Dec. 3, 2015     (WO) .................. PCT/EP2015/078543

(51) Int. Cl.
*H04W 48/12*     (2009.01)
*H04W 48/16*     (2009.01)
*H04W 48/20*     (2009.01)

(52) U.S. Cl.
CPC ........... *H04W 48/12* (2013.01); *H04W 48/16* (2013.01); *H04W 48/20* (2013.01)

(58) Field of Classification Search
None
See application file for complete search history.

(56) References Cited

U.S. PATENT DOCUMENTS

| 2015/0223149 A1* | 8/2015 | Liu ........................ H04W 48/12 |
| | | 370/252 |
| 2018/0069660 A1* | 3/2018 | Yi ........................... H04B 7/26 |

FOREIGN PATENT DOCUMENTS

| WO | WO 2014071967 A1 | 5/2014 |
| WO | WO 2014111155 A1 | 7/2014 |

(Continued)

OTHER PUBLICATIONS

3GPP TSG RAN WG1 #82 R1-153871 Aug. 24-28, 2015 Beijing, China; Qualcomm Incorporated; Discussion and Decision.

(Continued)

*Primary Examiner* — Diane L Lo
(74) *Attorney, Agent, or Firm* — Harrington & Smith

(57) ABSTRACT

A technique for differentiating licensed-assisted-access (LAA) cells (on which a UE may not be allowed to camp) from non-LAA cells (on which a UE may camp) including making at least one type of idle-mode cell selection measurement for at least one carrier in time resources determinable from broadcast system information; and refraining from making said at least one type of idle-mode cell selection measurement for said at least one carrier outside of said time resources; in alternative, the technique including creating a specific type of DRS for non-LAA cells which may be recognized by the UE (e. g., the DRS including an additional PSS sequence or being scrambled with a network-specific signature).

23 Claims, 5 Drawing Sheets

(56) References Cited

FOREIGN PATENT DOCUMENTS

WO  WO 2015/124208 A1  8/2015
WO  WO-2016/022064 A3  2/2016

OTHER PUBLICATIONS

3GPP TSG RAN WG1 Meeting #82-bis, Malmo, Sweden, Oct. 5-9, 2015, R1-155830, "DRS transmission over unlicensed carrier", ETRI, 6 pgs.
Samsung; "Discussion on LAA DRS design"; R1-152866; 3GPP TSG RAN WG1 Meeting #81, Fukuoka, Japan; May 25-29, 2015; whole document (8 pages).

* cited by examiner

700: TRANSMIT ON BROADCAST CHANNEL RADIO RESOURCES CELL SELECTION MEASUREMENT INFORMATION COMPRISING INDICATION OF TIME RESOURCES FOR IDLE-MODE CELL SELECTION MEASUREMENTS

Figure 7

800: TRANSMIT IN SOME TIME RESOURCES FIRST TYPE OF DRS RECOGNISABLE TO UE AS BEING OF USE FOR IDLE-MODE CELL SELECTION MEASUREMENTS, AND TRANSMIT IN OTHER TIME RESOURCES ONE OR MORE OTHER TYPES OF DRS RECOGNISABLE TO UE AS NOT BEING OF USE FOR IDLE-MODE CELL SELECTION MEASUREMENTS

Figure 8

IDLE-MODE CELL SELECTION MEASUREMENTS

One feature of a cellular network is camping by a communication device on a cell without establishing a radio resource control (RRC) connection with the cellular network. Camping on a cell involves the communication device tuning to at least some of the control channels of the cell. Camping on a cell enables the communication device to, for example: (i) acquire system information for the cell; (ii) readily establish a RRC (Radio Resource Control) connection with the network by initially accessing the network on the control channels of the cell; (iii) be paged by the network, if e.g. there is a call for the communication device or data to be transmitted to the communication device; and (iv) receive public warning information such as earthquake and tsunami warning system (EWTS) information and/or commercial mobile alert system (CMAS) information.

The selection by a communication device of a cell on which to camp is typically at least partly based on idle-mode measurements at the communication device of signals transmitted by one or more cells.

The inventors for the present application have identified the challenge of facilitating efficient and reliable idle-mode measurements at a communication device, particularly for cell selection in unlicensed spectrum.

There is hereby provided a method comprising: making at least one type of idle-mode cell selection measurement for at least one carrier in time resources determinable from broadcast system information; and refraining from making said at least one type of idle-mode cell selection measurement for said at least one carrier outside of said time resources.

According to one embodiment, the method further comprises determining on the basis of said system information time resources in which a cell node will attempt to transmit signals suitable for idle-mode cell selection measurements.

According to one embodiment, said signals are reference signals.

According to one embodiment, the reference signals are discovery reference signals.

According to one embodiment, said system information explicitly indicates said time resources, implicitly indicates said time resources, or provides information by which a communication device is capable of determining said time resources based on other additional information.

According to one embodiment, the method further comprises making said at least one type of idle-mode cell selection measurement in said time resources for at least a currently selected cell, and one or more neighbouring cells.

According to one embodiment, said at least one type of idle-mode selection measurement for at least one neighbouring cell is made at the same time as said at least one type of idle-mode selection measurement for said currently selected cell.

According to one embodiment, said at least one type of idle-mode selection measurement for at least one neighbouring cell is made at a different time to said at least one type of idle-mode selection measurement for said currently selected cell.

According to one embodiment, the method further comprises using said at least one type of idle-mode cell selection measurement to select a preferred cell on which to camp.

According to one embodiment, the method further comprises selecting a cell on which to camp based at least partly also on broadcast information indicative of one or more selection thresholds for one or more cells.

According to one embodiment, the method further comprises: making said at least one type of idle-mode cell selection measurement for a plurality of carriers in said time resources; and refraining from making said at least one type of idle-mode cell measurement for said plurality of carriers outside of said time resources.

According to one embodiment, the method further comprises: selecting a cell on which to camp based at least partly on the basis of said at least one type of idle-mode cell selection measurement in said time resources.

According to one embodiment, said broadcast system information identifies said time resources by reference to one or more of: periodicity, duration and offset relative to a reference time.

According to one embodiment, said reference time is the transmission time of a reference signal recognisable to the communication device as a time reference signal.

According to one embodiment, the method further comprises making at least one type of idle-mode cell selection measurement in said time resources for at least one carrier in unlicensed spectrum.

There is also hereby provided a method comprising: broadcasting system information on the basis of which a communication device is capable of determining time resources to make at least one type of idle-mode cell selection measurement for one or more carriers.

According to one embodiment, the system information identifies said time resources by reference to one or more of: periodicity, duration and offset relative to a reference time.

According to one embodiment, the system information indicates time resources to make at least one type of idle-mode cell selection measurement for at least one cell operating on unlicensed spectrum.

There is also hereby provided a method comprising: deciding whether to camp on a cell based at least partly on at least one type of idle-mode cell selection measurement based selectively on a type of discovery signal recognisable to a communication device as being of use for idle-mode cell selection measurements.

According to one embodiment, said cell operates on unlicensed spectrum.

There is also hereby provided a method comprising: transmitting in one or more time resources a first type of discovery signal recognisable to a communication device as being of use for at least one type of idle-mode cell selection measurement; and also transmitting in one or more other time resources discovery signals recognisable to a communication device as not being of use for at least one type of idle-mode selection measurement.

According to one embodiment, said discovery signals are for a cell operating on unlicensed spectrum.

There is also hereby provided an apparatus comprising: a processor and memory including computer program code, wherein the memory and computer program code are configured to, with the processor, cause the apparatus to: make at least one type of idle-mode cell selection measurement for at least one carrier in time resources determinable from broadcast system information; and refrain from making said at least one type of idle-mode cell selection measurement for said at least one carrier outside of said time resources.

According to one embodiment, the memory and computer program code are further configured to, with the processor, cause the apparatus to: determine on the basis of said system information time resources in which a cell node will attempt to transmit signals suitable for idle-mode cell selection measurements.

According to one embodiment, said signals are reference signals.

According to one embodiment, the reference signals are discovery reference signals.

According to one embodiment, said system information explicitly indicates said time resources, implicitly indicates said time resources, or provides information by which a communication device is capable of determining said time resources based on other additional information.

According to one embodiment, the memory and computer program code are further configured to, with the processor, cause the apparatus to: make said at least one type of idle-mode cell selection measurement in said time resources for at least a currently selected cell, and one or more neighbouring cells.

According to one embodiment, said at least one type of idle-mode selection measurement for at least one neighbouring cell is made at the same time as said at least one type of idle-mode selection measurement for said currently selected cell.

According to one embodiment, said at least one type of idle-mode selection measurement for at least one neighbouring cell is made at a different time to said at least one type of idle-mode selection measurement for said currently selected cell.

According to one embodiment, the memory and computer program code are further configured to, with the processor, cause the apparatus to: use said at least one type of idle-mode cell selection measurement to select a preferred cell on which to camp.

According to one embodiment, the memory and computer program code are further configured to, with the processor, cause the apparatus to: select a cell on which to camp based at least partly also on broadcast information indicative of one or more selection thresholds for one or more cells.

According to one embodiment, the memory and computer program code are further configured to, with the processor, cause the apparatus to: make said at least one type of idle-mode cell selection measurement for a plurality of carriers in said time resources; and refraining from making said at least one type of idle-mode cell measurement for said plurality of carriers outside of said time resources.

According to one embodiment, the memory and computer program code are further configured to, with the processor, cause the apparatus to: select a cell on which to camp based at least partly on the basis of said at least one type of idle-mode cell selection measurement in said time resources.

According to one embodiment, said broadcast system information identifies said time resources by reference to one or more of: periodicity, duration and offset relative to a reference time.

According to one embodiment, said reference time is the transmission time of a reference signal recognisable to the communication device as a time reference signal.

According to one embodiment, the memory and computer program code are further configured to, with the processor, cause the apparatus to: make at least one type of idle-mode cell selection measurement in said time resources for at least one carrier in unlicensed spectrum.

There is also hereby provided an apparatus comprising: a processor and memory including computer program code, wherein the memory and computer program code are configured to, with the processor, cause the apparatus to: broadcast system information on the basis of which a communication device is capable of determining time resources to make at least one type of idle-mode cell selection measurement for one or more carriers.

According to one embodiment, the system information identifies said time resources by reference to one or more of: periodicity, duration and offset relative to a reference time.

According to one embodiment, the system information indicates time resources to make at least one type of idle-mode cell selection measurement for at least one cell operating on unlicensed spectrum.

There is also hereby provided an apparatus comprising: a processor and memory including computer program code, wherein the memory and computer program code are configured to, with the processor, cause the apparatus to: decide whether to camp on a cell based at least partly on at least one type of idle-mode cell selection measurement based selectively on a type of discovery signal recognisable to a communication device as being of use for idle-mode cell selection measurements.

According to one embodiment, said cell operates on unlicensed spectrum.

There is also hereby provided an apparatus comprising: a processor and memory including computer program code, wherein the memory and computer program code are configured to, with the processor, cause the apparatus to: transmit in one or more time resources a first type of discovery signal recognisable to a communication device as being of use for at least one type of idle-mode cell selection measurement; and also transmit in one or more other time resources discovery signals recognisable to a communication device as not being of use for at least one type of idle-mode selection measurement.

According to one embodiment, said discovery signals are for a cell operating on unlicensed spectrum.

There is also hereby provided a computer program product comprising program code means which when loaded into a computer controls the computer to: make at least one type of idle-mode cell selection measurement for at least one carrier in time resources determinable from broadcast system information; and refrain from making said at least one type of idle-mode cell selection measurement for said at least one carrier outside of said time resources.

There is also hereby provided a computer program product comprising program code means which when loaded into a computer controls the computer to: broadcast system information on the basis of which a communication device is capable of determining time resources to make at least one type of idle-mode cell selection measurement for one or more carriers.

There is also hereby provided a computer program product comprising program code means which when loaded into a computer controls the computer to: decide whether to camp on a cell based at least partly on at least one type of idle-mode cell selection measurement based selectively on a type of discovery signal recognisable to a communication device as being of use for idle-mode cell selection measurements.

There is also hereby provided a computer program product comprising program code means which when loaded into a computer controls the computer to: transmit in one or more time resources a first type of discovery signal recognisable to a communication device as being of use for at least one type of idle-mode cell selection measurement; and also transmit in one or more other time resources discovery signals recognisable to a communication device as not being of use for at least one type of idle-mode selection measurement.

Examples of techniques according to embodiments of the invention are described hereunder in detail, by way of example only, with reference to the accompanying drawings, in which:

FIG. 7 illustrates one example of operations at a cell node according to an embodiment of the present invention; and FIG. 8 illustrates one example of operations at a cell node according to an embodiment of the present invention.

A technique according to an embodiment of the present invention is described in detail below for the example of making idle-mode cell selection measurements for LTE (Long Term Evolution) access network cells operating on unlicensed spectrum, but the same technique is applicable to making idle-mode cell selection measurements for other kinds of cells.

Figure 1:
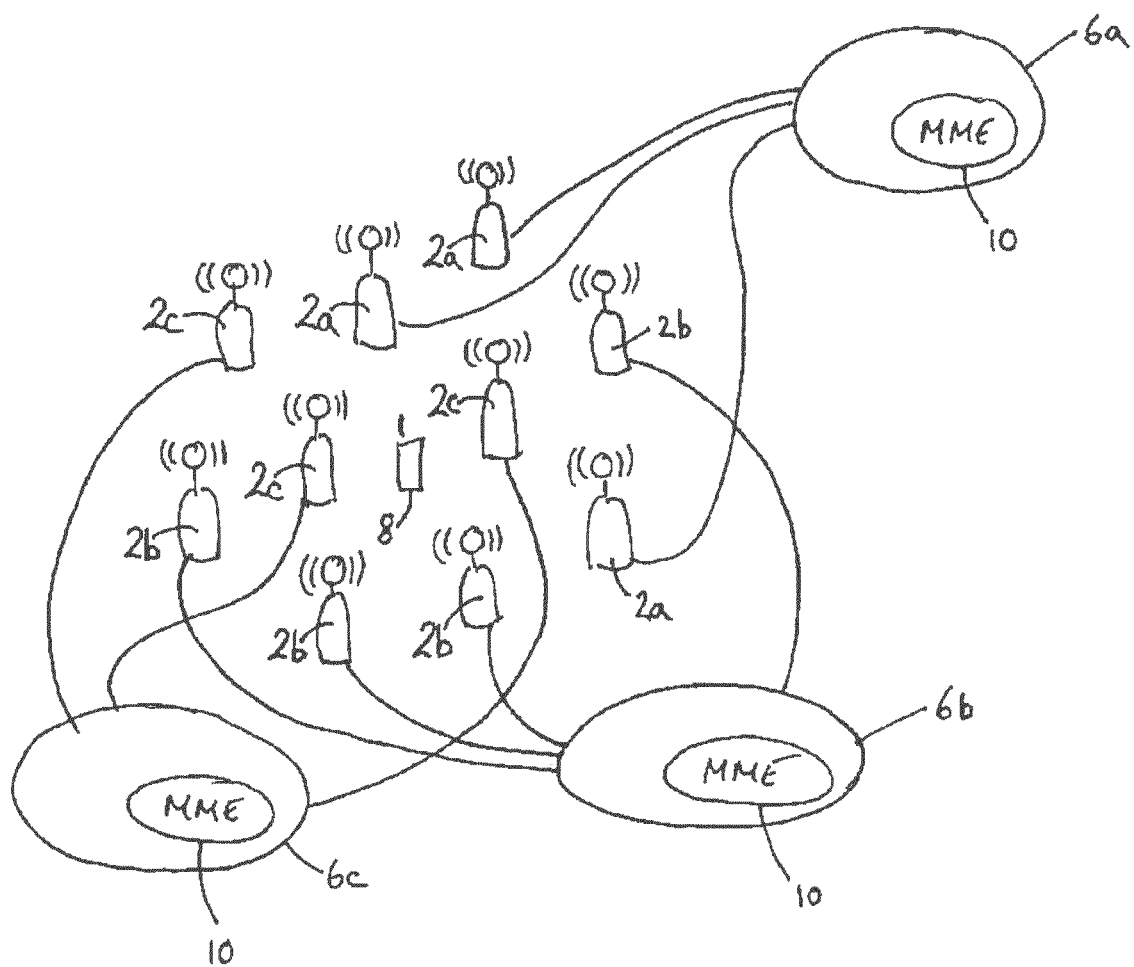
FIG. 1 illustrates one example of an environment in which embodiments of the present invention may be implemented.

FIG. 1 schematically shows an example of a user equipment (UE) 8 located within the coverage area of a plurality of LTE access network eNBs 2 belonging to three access networks and operating cells on unlicensed spectrum. A LTE access network may also comprises a large number of macro cells (not shown) operated on licensed spectrum and e.g. smaller cells (not shown) e.g. femto cells, pico cells also operated on licensed spectrum; but some LTE networks may equally consist solely of cells operating on unlicensed spectrum. FIG. 1 only shows a small number of cells operating on unlicensed spectrum, but a LTE access network may comprises a large number of these cells.

In the example of FIG. 1, each of the unlicensed spectrum cell nodes (eNBs) 2 are connected to an evolved packet core (EPC) 6 for the network to which they belong, which EPC 6 includes a mobile management entity (MME) 10; but some access networks (such as access networks consisting solely of cells operating on unlicensed spectrum) may not comprise any evolved packet core, but will comprise a MME to which each cell node (access point) is connected. One function of the mobile management entity 10 is to maintain tracking area (TA) lists indicating the location areas in which each UE 8 camped on some cell of the respective network is located, so that a UE camped on some cell of the network can be readily paged in e.g. the event that there is a call for the UE or data to be transmitted to the UE. Each LTE cellular radio access network may also include other elements, but these are not shown in FIG. 1 for conciseness.

Figure 2:
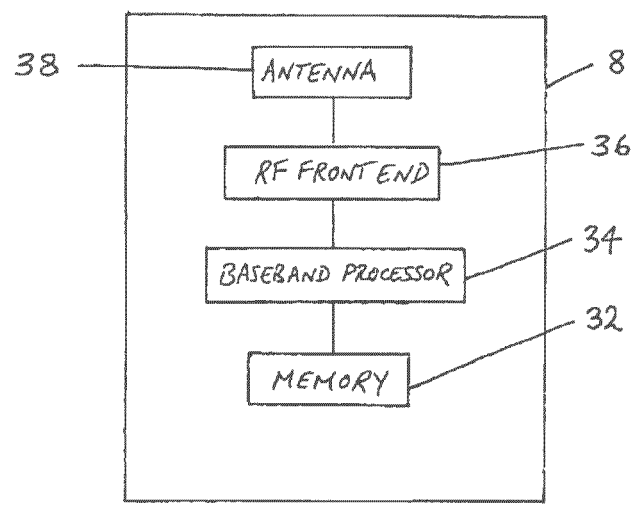
FIG. 2 illustrates one example of apparatus for use at the communication device of FIG. 1.

FIG. 2 shows a schematic view of an example of apparatus for UE 8. The UE 8 may be used for various tasks such as making and receiving phone calls, receiving and sending data from and to a data network, and experiencing, for example, multimedia or other content. The UE 8 may be any device at least capable of both recovering data/information from radio signals transmitted by eNBs of the network (for both unlicensed and licensed spectrum cells), and transmitting radio signals including data/information recoverable by the eNBs of the network. Non-limiting examples of user equipment (UE) 8 include smartphones, tablets, personal computers, and devices without any user interface, such as devices that are designed for machine type communications (MTC).

With reference to FIG. 2, a baseband processor 34, operating in accordance with program code stored at memory 32, controls the generation and transmission of radio signals via radio-frequency front end 36 and antenna 38. The RF front end may include an analogue transceiver, filters, a duplexer, and antenna switch. Also, the combination of antenna 38, RF front end 36 and baseband processor 34 recovers data/information from radio signals reaching UE 8 from e.g. eNBs 2 operating unlicensed spectrum cells. The UE 8 may also comprise an application processor (not shown) that generates user data for transmission via radio signals, and processes user data recovered from radio signals by baseband processor 34 and stored at memory 32.

The application processor and the baseband processor 34 may be implemented as separate chips or combined into a single chip. The memory 32 may be implemented as one or more chips. The memory 32 may include both read-only memory and random-access memory. The above elements may be provided on one or more circuit boards.

The UE may include additional other elements not shown in FIG. 2. For example, the UE 8 may include a user interface such as key pad 201, voice commands, touch sensitive screen or pad, combinations thereof or the like, via which a user may control operation of the UE 8. The UE 8 may also include a display, a speaker and a microphone. Furthermore, the UE 8 may comprise appropriate connectors (either wired or wireless) to other devices and/or for connecting external accessories (e.g. hands-free equipment) thereto.

Figure 3:
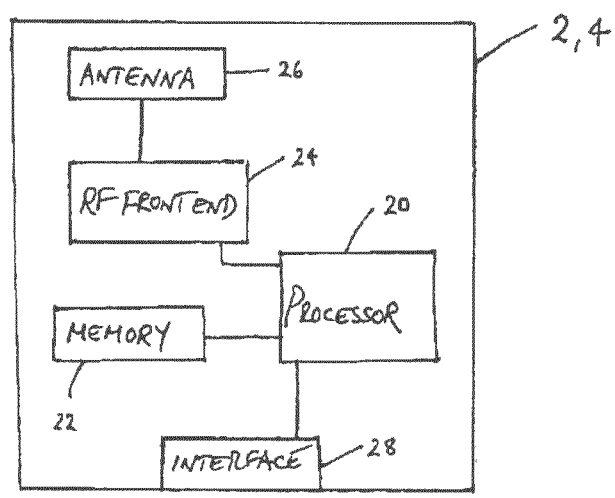
FIG. 3 illustrates one example of apparatus for use at the cell nodes of FIG. 1.

FIG. 3 shows an example of apparatus for use at each of the eNBs 2 of FIG. 1 operating unlicensed spectrum cells. A broadband processor 20, operating in accordance with program code stored at memory 22, (a) controls the generation and transmission of radio signals via the combination of radio-frequency front end 24 and antenna 26; and (b) recovers data from radio signals reaching the eNB from e.g. UE 8. The RF front end may include an analogue transceiver, filters, a duplexer, and antenna switch. Both the processor 20 and the memory 22 may be implemented as one or more chips. The memory 22 may include both read-only memory and random-access memory. The above elements may be provided on one or more circuit boards. The apparatus also comprises an interface 28 for transferring data to and from one or more other parts of the same access network such as e.g. the EPC 6 and other eNBs in the same access network.

It should be appreciated that the apparatus shown in each of FIGS. 2 and 3 described above may comprise further elements which are not directly involved with the embodiments of the invention described hereafter.

Figure 6:
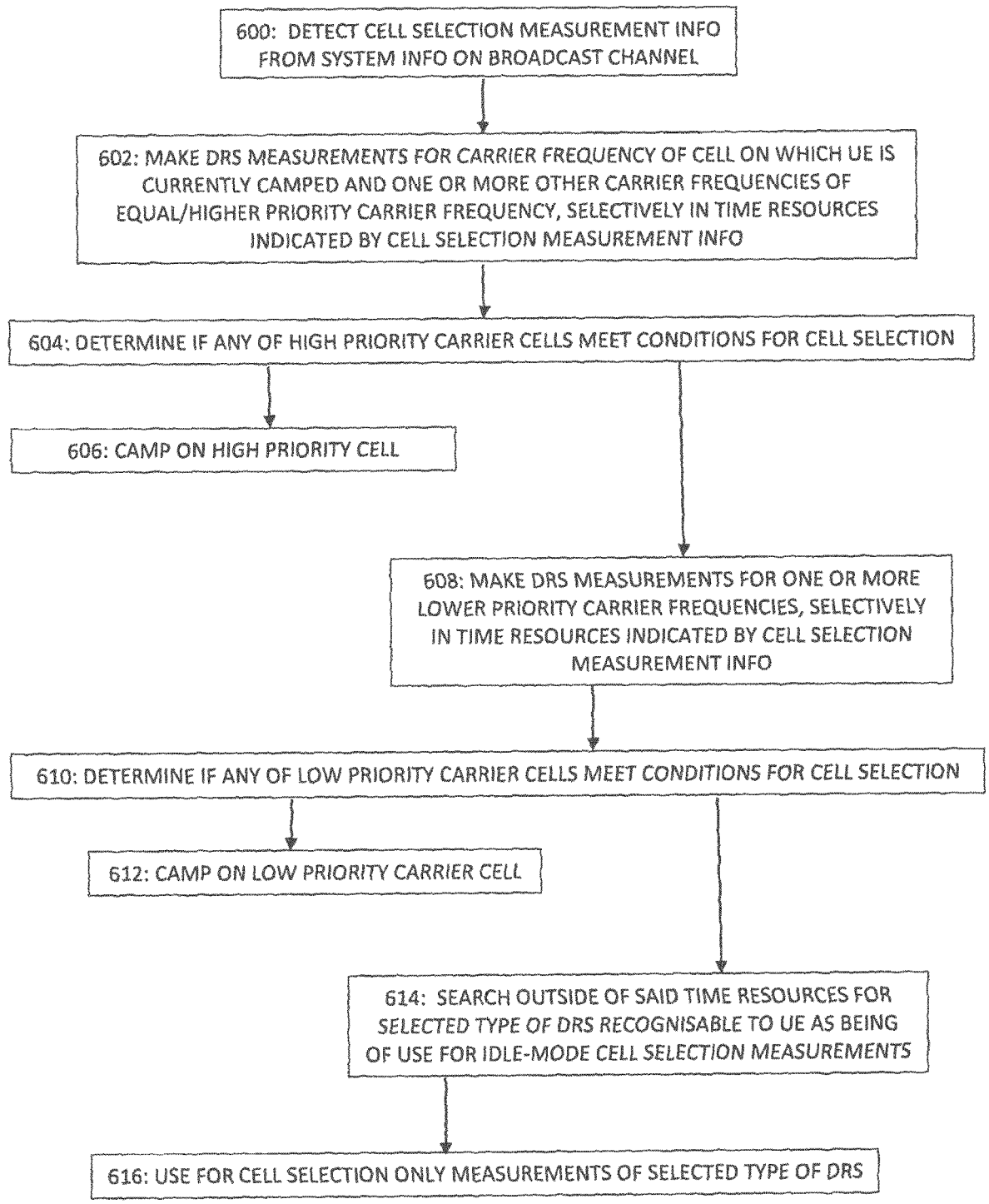
FIG. 6 illustrates one example of a set of operations at a communication device according to an embodiment of the present invention.

FIGS. 6 to 8 illustrate an example of operations at eNBs 2 and UE 8 according to one embodiment for this example. All operations carried out by the processor 34 follow program code stored at memory 32; and all operations carried out by the processor 20 follow program code stored at memory 22.

Figure 4:
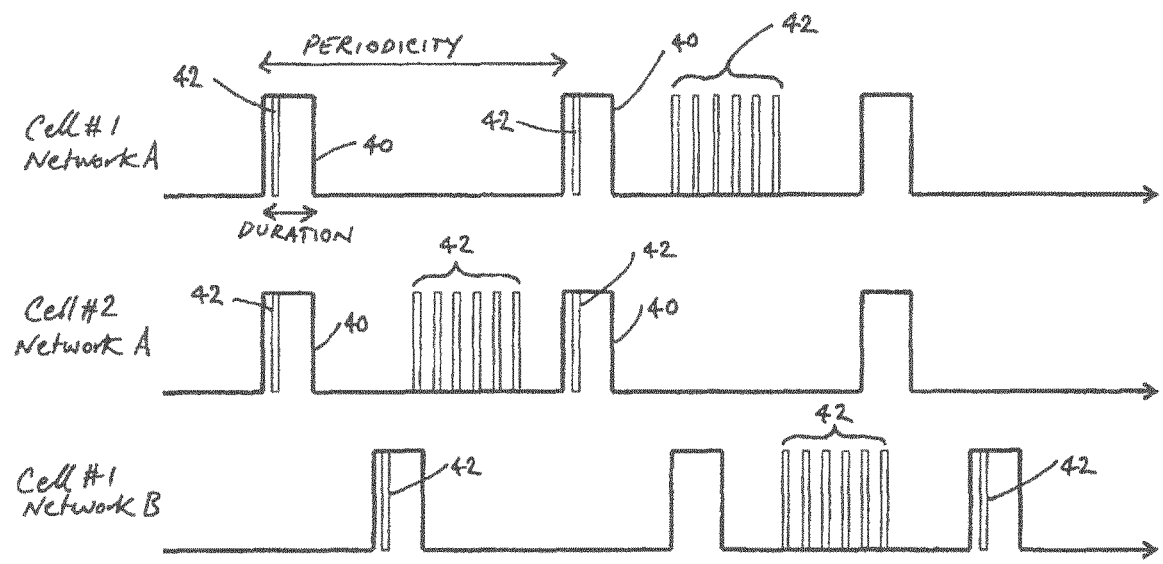
FIG. 4 illustrates one example of transmitting discovery reference signals for use in idle-mode cell selection measurements in some time resources, and transmitting discovery reference signals not for use in idle-mode cell selection measurements in other time resources.

The baseband processor 20 at eNB 2 transmits (via RF front end 24 and antenna 26), on broadcast channel radio resources of an unlicensed spectrum cell, system information including cell selection measurement information (STEP 700) for idle-mode UEs. The cell selection information includes an indication of time resources 40 in which to make idle-mode measurements of discovery reference signals (DRS) 42 for the purpose of selecting which cell to camp on in idle mode. With reference to FIG. 4, the cell selection information indicates time resources 40 in which DRS (Primary Synchronisation Signal (PSS)/Secondary Synchronisation Signal (SSS)/Cell-specific Reference Signal (CRS)) for the cell allow relatively reliable and good-quality RRM (Radio Resource Management) measurements, because e.g. there is less risk of transmission power fluctuations due to multicarrier operation. There is not necessarily transmission of DRS in all time resources indicated in the cell selection information; for example, there may be no transmission of DRS in time resources where the listen-before-talk (LBT) procedure fails (i.e. the channel is sensed as busy). The cell selection information is for use by UE 8 currently camped on the cell to determine when to make idle-mode cell selection measurements on the corresponding carrier frequency. In this way UE 8 can perform measurements on the cell it is camping on, as well as on e.g. neighbouring cells of the same network operating on the same (unlicensed) carrier frequency, whereby the UE 8 may further limit the time required to perform intra-frequency (i.e. on same carrier frequency as the cell where UE 8 is currently camping on) idle mode cell selection measurements, thereby reducing power consumption at the UE 8. Similarly, the cell selection measurement information may also apply to other (unlicensed) carrier frequencies, whereby the UE 8 may further limit the time required to perform idle mode measurements not only on the carrier frequency of the currently-selected cell, but also on one or more other (unlicensed) carrier frequencies that have equal or higher priority, and even also on one or more lower priority carrier frequencies. A UE 8 may know the priority level assigned to each carrier frequency by the network, by means of e.g. broadcast system information or information received from the network when the most recent RRC connection between the UE and the network was released.

The system information may identify time resources for making cell selection measurements, by e.g. reference to one or more of periodicity, duration and offset relative to a reference sub-frame. In more detail, the system information may include one or more of: (i) a 2-bit field indicating a time period at which time resources for cell selection measurements exist; (ii) a 2-3 bit field indicating duration of time resources for cell selection measurements: and (iii) a 2-3 bit field indicating the location of time resources for cell selection measurements relative to a reference sub-frame. In one example, the reference sub-frame is determined by the UE as the sub-frame in which the system information is transmitted. All of this system information content may, for example, be jointly coded into a single broadcast message. In another example, the reference sub-frame is determined by the UE as the sub-frame in which it detects a specific reference signal (e.g. a reference signal recognisable to the user equipment as being of use for idle-mode cell selection measurements).

The UE baseband processor 34 of a UE 8 camped on the eNB cell acquires the cell selection measurement information from the system information broadcast by the eNB on the broadcast channel radio resources (STEP 600), and stores the cell selection measurement information in memory 32.

The UE baseband processor 34 makes idle-mode measurements of DRS 42 selectively in the time resources 40 indicated in the cell selection measurement information (i.e. does not make idle-mode measurements of DRS 42 for cell selection purposes outside the indicated time resources 40), for at least the carrier frequency of the currently-selected cell, and also for one or more carrier frequencies having a priority level equal to or higher than that of the carrier frequency of the currently selected cell, if the idle-mode cell selection information also applies to such other carrier frequencies (STEP 602). The UE baseband processor 34 stores the results of the idle-mode measurements at memory 32.

The UE baseband processor 34 then compares the idle-mode measurement results against one or more pre-configured thresholds (also stored at memory 32) related to idle-mode cell (re)selection, including e.g. one or more RSRP (Reference Signal Received Power) thresholds and/or one or more RSRQ (Reference Signal Received Power) thresholds; and determines whether any of the measured cells meet the preconfigured conditions related to cell (re)selection (STEP 604).

If the determination of STEP 604 is positive, the UE baseband processor 34 either remains camped in idle-mode on the currently-selected cell (if the currently selected cell meets the conditions for cell selection, and there are no higher priority cells (i.e. cells operated on a carrier frequency with higher priority than that of the currently selected cell), or initiates idle-mode procedures for cell re-selection towards a higher priority cell (if one of the higher priority cells meets the conditions for idle-mode cell selection) (STEP 606). Even if another cell operating on the same carrier frequency (or another equal priority carrier frequency) has a higher signal strength or quality than the currently selected cell, the UE may decide to stay camped on the currently selected cell, if the signal strength or quality of the currently selected cell is sufficiently high.

For example: if the UE baseband processor 34 determines that another cell (on the same carrier frequency, or on a different carrier frequency with an equal or higher priority level) has a RSRP that is both (i) higher than the RSRP for the currently-selected cell by a certain offset value, and (ii) above a preconfigured RSRP threshold for idle-mode cell selection, the UE baseband processor 34 initiates idle-mode cell re-selection towards the other cell (after having verified that the cell is of a type on which UEs can camp, e.g. it belongs to the same network). As mentioned in the preceding paragraph, the UE may be configured not to re-select a higher RSRP cell operating on the same carrier frequency (or other equal priority carrier frequency), if the RSRP for the currently-selected cell is sufficiently high.

If the determination of STEP 604 is negative (i.e. if the signal strength or quality of the currently selected cell is not sufficiently good (e.g. the RSRP of the currently selected cell is below a threshold value), and there are no other high priority cells for which the signal strength or quality is sufficiently good (e.g. the RSRP of all other high priority cells is below a threshold value), the UE baseband processor 34 makes measurements of DRS 42 in the time resources 40 indicated in the idle-mode cell selection measurement information for cells belonging to the same network as the currently-selected cell but operating on carrier frequencies having a lower priority level than the carrier frequency of the currently-selected cell (STEP 608).

The UE baseband processor 34 determines whether any of these lower priority frequency cells meet the pre-configured conditions for cell selection (STEP 610).

If the determination of STEP 610 is positive, the UE baseband processor 34 initiates the procedures for idle-mode cell re-selection towards the lower priority cell meeting the conditions for idle-mode cell selection (STEP 612).

Figure 5:
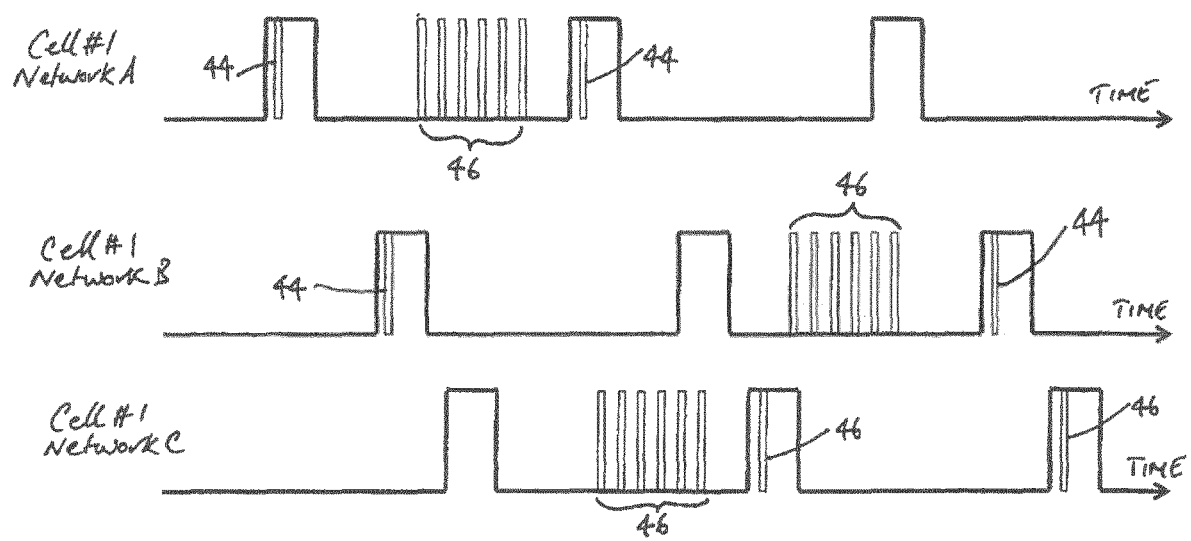
FIG. 5 illustrates one example of transmitting some discovery reference signals recognisable to user equipment as being of use for idle-mode cell selection measurements, and some discovery reference signals recognisable to user equipment as not being of use for idle-mode cell selection measurements.

If the determination of STEP 612 is negative, the UE baseband processor 34 searches outside the time resources 40 indicated in the cell system information for a specific type of DRS recognisable to the UE as being of use for idle-mode cell selection measurements (STEP 614 of FIG. 6). As illustrated in FIG. 5, the eNB baseband processors 20 of one or more eNBs 2 operating one or more cells on unlicensed spectrum may transmit this specific type of DRS 44 in some time resources; and transmit one or more other types of DRS 46 (recognisable to the UE as not being of use for idle-mode cell selection measurements) in other time resources (STEP 800 of FIG. 8). The above-mentioned specific type of DRS could additionally be recognised by UEs as an indication that the cell is an unlicensed spectrum cell on which UEs can camp (i.e. not an unlicensed spectrum cell on which UEs cannot camp, such as a licensed-assisted-access (LAA) cell specified in LTE Release 13 as an unlicensed spectrum cell which can only be used as a secondary cell by UEs that are connected to a primary cell operated on licensed spectrum). Cells on which UEs cannot camp (such as LAA cells), e.g. Cell #1 of Network C of FIG. 5, will not transmit this specific type of DRS.

As mentioned above, the specific type of DRS may also be used as a time reference from which a UE can determine the timing of DRS transmissions suitable for idle-mode cell selection measurements.

The above-mentioned specific type of DRS may, for example, be characterised by the inclusion of an additional PSS sequence in the DRS. Alternatively, the specific type of DRS may, for example, be characterised by being scrambled with a network-specific signature.

The UE baseband processor 34 makes DRS idle-mode measurements of those DRS detected outside the time resources indicated in the cell selection measurement information, and retains for idle-mode cell selection determinations (by storage at memory 32) only those idle-mode measurements for DRS 44 including the above-mentioned indication (STEP 616). The UE baseband processor 34 then again compares the retained idle-mode measurement results against one or more preconfigured thresholds (also stored at memory 32) related to idle-mode cell (re)selection, including e.g. one or more RSRP thresholds and/or one or more RSRQ thresholds; and determines whether any of the measured cells meet the preconfigured conditions related to cell (re)selection.

The above-described measurement of DRS outside the time resources indicated in the cell selection information may be performed in stages for different carrier frequencies in order of priority level.

In the technique described above, the restriction on performing cell selection measurements for one or more cells selectively in the time resources indicated in the idle-mode cell selection measurement information may only apply to a limited one or more types of idle-mode cell selection measurements. For example, the restrictions may apply only to RSRP and RSRQ measurements, or apply only to RSRP, RSRQ and (Received Signal Strength Indicator) measurements.

In the example described above, the system information includes explicit idle-mode cell selection information explicitly indicating the time resources at which to make idle-mode cell selection measurements. However, in alternative examples, the time resources at which to make idle-mode cell selection measurements may be implicit from information included in the system information for other primary purpose(s); or the UE 8 may be capable of determining the time resources for making idle-mode cell selection measurements based partly on information included in the broadcast system information and other information outside of the broadcast system information, such as information derivable from cell transmission patterns observed by the UE 8.

The above-described techniques facilitate a reduction in power consumption at idle-mode UEs by limiting the amount of time a UE needs to perform cell search and RRM measurements when camping on a cell. The above-described technique also facilitates better reliability of RRM measurements by an idle mode UE camped on a cell, by providing the UE with an indication of when reliable intra-frequency and inter-frequency RRM measurements can be made.

The present invention has particular (but not exclusive) use in networks enabling standalone operation on unlicensed spectrum, according to which the eNB/UE wireless interface relies solely on unlicensed spectrum without any anchor carrier on licensed spectrum.

Appropriately adapted computer program code product may be used for implementing the embodiments, when loaded to a computer. The program code product for providing the operation may be stored on and provided by means of a carrier medium such as a carrier disc, card or tape. A possibility is to download the program code product via a data network. Implementation may be provided with appropriate software in a server.

Embodiments of the invention may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

In addition to the modifications explicitly mentioned above, it will be evident to a person skilled in the art that various other modifications of the described embodiment may be made within the scope of the invention.

The invention claimed is:
1. A method comprising:
making at least one type of idle-mode cell selection measurement for at least one carrier in time resources determinable from broadcast system information; and
refraining from making said at least one type of idle-mode cell selection measurement for said at least one carrier outside of said time resources.
2. A method according to claim 1, comprising determining on the basis of said system information time resources in which a cell node will attempt to transmit signals suitable for idle-mode cell selection measurements.

3. A method according to claim 2, wherein said signals are discovery reference signals.

4. A method according to claim 1, wherein said system information explicitly indicates said time resources, implicitly indicates said time resources, or provides information by which a communication device is capable of determining said time resources based on other additional information.

5. A method according to claim 1, comprising making said at least one type of idle-mode cell selection measurement in said time resources for at least a currently selected cell, and one or more neighbouring cells.

6. A method according to claim 1, comprising:
making said at least one type of idle-mode cell selection measurement for a plurality of carriers in said time resources; and
refraining from making said at least one type of idle-mode cell measurement for said plurality of carriers outside of said time resources.

7. A method according to claim 1, further comprising:
selecting a cell on which to camp based at least partly on the basis of said at least one type of idle-mode cell selection measurement in said time resources.

8. A method according to claim 1, wherein said broadcast system information identifies said time resources by reference to one or more of: periodicity, duration or offset relative to a reference time.

9. A method according to claim 8, wherein said reference time is the transmission time of a reference signal recognisable to the communication device as a time reference signal.

10. A method according to claim 1, comprising making at least one type of idle-mode cell selection measurement in said time resources for at least one carrier in unlicensed spectrum.

11. A method comprising:
transmitting in one or more time resources a first type of discovery signal recognisable to a communication device as being of use for at least one type of idle-mode cell selection measurement; and
transmitting in one or more other time resources discovery signals recognisable to a communication device as not being of use for at least one type of idle-mode selection measurement.

12. An apparatus comprising: a processor and memory including computer program code, wherein the memory and computer program code are configured to, with the processor, cause the apparatus to:
make at least one type of idle-mode cell selection measurement for at least one carrier in time resources determinable from broadcast system information; and
refrain from making said at least one type of idle-mode cell selection measurement for said at least one carrier outside of said time resources.

13. An apparatus according to claim 12, wherein the memory and computer program code are further configured to, with the processor, cause the apparatus to determine on the basis of said system information time resources in which a cell node will attempt to transmit signals suitable for idle-mode cell selection measurements.

14. An apparatus according to claim 13, wherein said signals are discovery reference signals.

15. An apparatus according to claim 12, wherein said system information explicitly indicates said time resources, implicitly indicates said time resources, or provides information by which the apparatus is capable of determining said time resources based on other additional information.

16. An apparatus according to claim 12, wherein the memory and computer program code are further configured to, with the processor, cause the apparatus to make said at least one type of idle-mode cell selection measurement in said time resources for at least a currently selected cell, and one or more neighbouring cells.

17. An apparatus according to claim 12, wherein the memory and computer program code are further configured to, with the processor, cause the apparatus to:
make said at least one type of idle-mode cell selection measurement for a plurality of carriers in said time resources; and
refrain from making said at least one type of idle-mode cell measurement for said plurality of carriers outside of said time resources.

18. An apparatus according to claim 12, wherein the memory and computer program code are further configured to, with the processor, cause the apparatus to:
select a cell on which to camp based at least partly on the basis of said at least one type of idle-mode cell selection measurement in said time resources.

19. An apparatus according to claim 12, wherein said broadcast system information identifies said time resources by reference to one or more of: periodicity, duration or offset relative to a reference time.

20. An apparatus according to claim 12, wherein said reference time is the transmission time of a reference signal recognisable to the apparatus as a time reference signal.

21. An apparatus according to claim 12, wherein the memory and computer program code are further configured to, with the processor, cause the apparatus to make at least one type of idle-mode cell selection measurement in said time resources for at least one carrier in unlicensed spectrum.

22. An apparatus comprising:
a processor and memory including computer program code, wherein the memory and computer program code are configured to, with the processor, cause the apparatus to:
transmit in one or more time resources a first type of discovery signal recognisable to a communication device as being of use for at least one type of idle-mode cell selection measurement; and
transmit in one or more other time resources discovery signals recognisable to a communication device as not being of use for at least one type of idle-mode selection measurement.

23. A computer program product comprising a non-transitory computer readable medium having a program thereon, which when loaded into a computer controls the computer to:
make at least one type of idle-mode cell selection measurement for at least one carrier in time resources determinable from broadcast system information; and
refrain from making said at least one type of idle-mode cell selection measurement for said at least one carrier outside of said time resources.

* * * * *